United States Patent
Maeda et al.

(10) Patent No.: US 10,180,675 B2
(45) Date of Patent: Jan. 15, 2019

(54) MACHINE TOOL CONTROL DEVICE AND MACHINE TOOL

(71) Applicant: MAKINO MILLING MACHINE CO., LTD., Tokyo (JP)

(72) Inventors: Junichi Maeda, Aiko-gun (JP); Yasunori Masumiya, Aiko-gun (JP); Yoshikazu Hattori, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 280 days.

(21) Appl. No.: 14/439,558

(22) PCT Filed: Oct. 31, 2012

(86) PCT No.: PCT/JP2012/078197
§ 371 (c)(1),
(2) Date: Apr. 29, 2015

(87) PCT Pub. No.: WO2014/068709
PCT Pub. Date: May 8, 2014

(65) Prior Publication Data
US 2015/0293519 A1    Oct. 15, 2015

(51) Int. Cl.
*G06F 19/00* (2018.01)
*G05B 19/19* (2006.01)
(Continued)

(52) U.S. Cl.
CPC ............... *G05B 19/19* (2013.01); *B23C 3/00* (2013.01); *G05B 19/4093* (2013.01); *G05B 2219/50154* (2013.01); *Y02P 90/265* (2015.11)

(58) Field of Classification Search
CPC ...................................................... G05B 19/19
(Continued)

(56) References Cited

U.S. PATENT DOCUMENTS

| 4,031,809 | A |   | 6/1977 | Shraiman et al. |
| 5,866,025 | A | * | 2/1999 | Kataoka ................. B29C 33/40 249/114.1 |

(Continued)

FOREIGN PATENT DOCUMENTS

| CN | 102640067 | 8/2012 |
| EP | 1 034 865 | 9/2000 |

(Continued)

OTHER PUBLICATIONS

International Search Report dated Dec. 11, 2012, directed towards International Application No. PCT/JP2012/078197, 3 pages.

*Primary Examiner* — Mohammad Ali
*Assistant Examiner* — Sheela Rao
(74) *Attorney, Agent, or Firm* — Morrison & Foerster LLP

(57) ABSTRACT

A machine tool for machining a workpiece includes a control device for moving a rotating tool relative to the workpiece. The device includes an input information-reading unit and a path-setting unit. The input information-reading unit reads input information, which relates to a path along the contour of the workpiece or the tool path of a first rotating tool that follows the external form of the workpiece. The path-setting unit converts the input information read by the input information-reading unit to generate a tool path for performing the machining using the end cutting edge of a second rotating tool.

3 Claims, 12 Drawing Sheets

(51) Int. Cl.
   *B23C 3/00*     (2006.01)
   *G05B 19/4093* (2006.01)

(58) Field of Classification Search
   USPC .................................................. 700/159–212
   See application file for complete search history.

(56) References Cited

U.S. PATENT DOCUMENTS

| | | | |
|---|---|---|---|
| 6,491,482 B1 | 12/2002 | Fenkl et al. | |
| 8,453,545 B2 * | 6/2013 | Lin ........................... | B23B 1/00 |
| | | | 82/1.11 |
| 2006/0111032 A1 * | 5/2006 | Weston .................... | B24D 7/18 |
| | | | 451/557 |
| 2007/0011861 A1 * | 1/2007 | Kosuge .................. | B23B 5/166 |
| | | | 29/559 |
| 2010/0204814 A1 * | 8/2010 | Neumaier ........ | G05B 19/40937 |
| | | | 700/97 |
| 2012/0207869 A1 * | 8/2012 | Imai .......................... | B23C 3/20 |
| | | | 425/175 |
| 2012/0215334 A1 | 8/2012 | Tanuma et al. | |
| 2013/0253695 A1 | 9/2013 | Iuchi et al. | |

FOREIGN PATENT DOCUMENTS

| | | |
|---|---|---|
| EP | 2 833 224 | 2/2015 |
| JP | 7-185997 | 7/1995 |
| JP | 8-249032 | 9/1996 |
| JP | 2000-263309 | 9/2000 |
| JP | 2001-198718 | 7/2001 |
| JP | 2003-145334 | 5/2003 |
| JP | 2012-161861 | 8/2012 |
| WO | WO-98/19823 | 5/1998 |
| WO | WO 2012/101789 | 8/2012 |
| WO | WO-2012/144081 | 10/2012 |

* cited by examiner

MACHINE TOOL CONTROL DEVICE AND MACHINE TOOL

CROSS-REFERENCE TO RELATED APPLICATIONS

This application is a U.S. National Phase patent application of International Patent Application No. PCT/JP2012/078197, filed on Oct. 31, 2012, which is hereby incorporated by reference in the present disclosure in its entirety.

FIELD OF THE INVENTION

The present invention relates to a control device of a machine tool and a machine tool.

BACKGROUND OF THE INVENTION

Machine tools which perform machining such as cutting by moving a tool relative to a workpiece are known in conventional art. In such machine tools, numerical control machine tools are known which specify a path of a tool by coordinates of predetermined axes or the like and perform machining by automatically moving the tool with respect to a workpiece. Such a numerical control machine tool can perform machining on a desired tool path and at a desired velocity by describing machine coordinates or moving velocity of a tool on a machining program.

Patent Literature 1 discloses a curved surface cutting method in which a machining surface having a curved shape is obtained by using a milling tool such as a face milling cutter. This document discloses that the surface of an object to be machined is cut by using a milling tool whose rotation locus of cutting edge is circular and by moving the milling tool in a predetermined tool feeding direction in a state in which the rotation axis of the milling tool is inclined with respect to the normal line of a machining surface.

Patent Literature 2 discloses a milling method which performs machining, by progressively bringing a milling tool close to a finished portion from a bulk material, while always removing the cut material, and a method of forming a track for the milling tool. This document discloses that a milling tool is guided along a continuous track whose cross-sectional shape is a spiral from the external contour of a bulk member to a contour portion of a finished member to change the shape of the member progressively.

CITATIONS LIST

Patent Literature 1: Japanese Laid-Open Patent Application No. 2003-145334
Patent Literature 2: Japanese Laid-Open Patent Application No. 2000-263309

SUMMARY OF THE INVENTION

It is known that when the width of a region where a workpiece is machined is small in a method of machining a workpiece, a side cutting edge of a rotary tool is used to machine the workpiece. For example, it is known that a side face of a plate member is machined by allowing a side cutting edge of a rod-like rotary tool such as an end mill to abut on a workpiece.

However, in such a machining method, an end mill having a large tool diameter needs to be used to lessen the cusp height of a machining surface to perform high-precision machining. An end mill having a large tool diameter causes a problem that a large-sized machine tool is needed since the diameter of a tool to be used is large, and also causes a problem that machining time is prolonged.

A high cutting speed is required for creating a highly accurate machining surface. However, when an end mill is rotated at a high speed, a spindle shaft of the end mill swings or vibrates, which may negatively affect the machining surface. It is also desired that an end mill which employs a special material such as diamond is used for performing high-precision machining such as mirror finishing.

As mentioned above, high-precision machining such as mirror finishing has a problem that a large-sized end mill needs to be used or an end mill made of a special material needs to be used.

A control device of a machine tool according to the present invention is a control device of a machine tool which machines a workpiece while a rotary tool is moved relative to a workpiece, comprising an input information reading unit which reads input information including a path passing through the contour of the workpiece or a tool path of a first rotary tool along the outline of the workpiece and a path setting unit which converts input information read by the input information reading unit to create a tool path along which machining is performed by using an end cutting edge of a second rotary tool.

According to the above-described invention, the input information reading unit can be configured to read the input information including a tool path along which machining is performed by using the side cutting edge of the first rotary tool, and the path setting unit converts the input information, and generates a tool path in which machining is performed by using the end cutting edge of the second rotary tool whose diameter is larger than that of the first rotary tool.

According to the above-described invention, the path setting unit can generate a tool path in which machining is performed by inclining the second rotary tool relative to the workpiece so that the bottom face of the second rotary tool is inclined with respect to a machining surface of the workpiece.

According to the above-described invention, the input information reading unit can read a first machining program as the input information including a tool path of the first rotary tool, and the path setting unit outputs a second machining program including a tool path in which machining is performed by using an end cutting edge of the second rotary tool.

A machine tool of the present invention comprises the above control device of the machine tool and a moving device which moves the second rotary tool relative to a workpiece in accordance with a tool path set by the path setting unit.

According to the present invention, a control device of a machine tool in which machining precision of a machining surface is improved and the machine tool can be provided.

DETAILED DESCRIPTION OF THE INVENTION

With reference to FIGS. 1 to 19, a control device of a machine tool and the machine tool are described. Examples of the machine tool include a vertical machining center whose spindle shaft extends in the vertical direction. In the following embodiments, a first rotary tool is an end mill, and a second rotary tool is a milling cutter. Herein, a side face of a plate member is machined by using an end cutting edge of a milling cutter.

Figure 1:
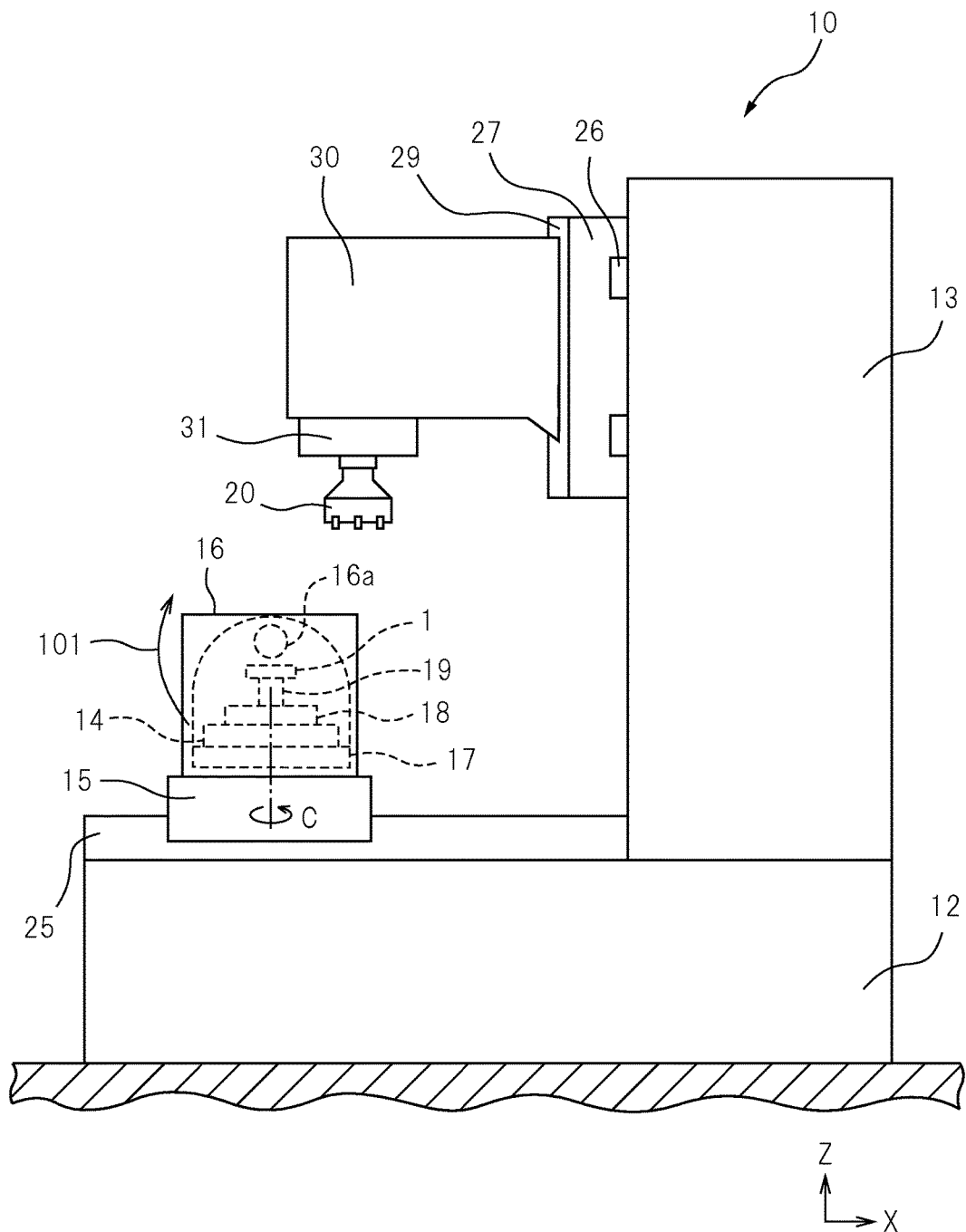
FIG. 1 is a schematic side view of a numerical control machine tool.

FIG. 1 is a schematic view of a numerical control machine tool. A milling cutter 20 serving as a rotary tool for machining is attached to a machine tool 10. A workpiece 1 serving as an object to be machined is fixed on a table 14.

The machine tool 10 comprises a bed 12, which is placed on the floor of a factory or the like and a column 13, which is fixed on the bed 12. The machine tool 10 includes a moving device which moves the milling cutter 20 and the workpiece 1 relative to each other.

A X-axis guide rail 25 is arranged on the top surface of the bed 12. The X-axis guide rail 25 extends in the X-axis direction (right and left direction in FIG. 1). A saddle 15 is engaged with the X-axis guide rail 25. The saddle 15 is formed so as to move in the X-axis direction along the X-axis guide rail 25. A turning base 16 which is a swiveling device is mounted on the saddle 15. The turning base 16 supports a table swiveling base 17 via a turning shaft 16a. The turning shaft 16a extends in the Y-axis direction. The turning base 16 is formed so as to turn the table swiveling base 17 around the turning shaft 16a as indicated by an arrow 101. The table 14 is fixed to the table swiveling base 17.

A numerical control rotary table 18 for rotating the workpiece 1 around a C-axis is arranged on the top surface of the table 14. The workpiece 1 is fixed to the rotary table 18 via a holding member 19 for holding the workpiece.

A moving device is driven, and thus the table 14 moves in the X-axis direction together with the saddle 15 and the turning base 16. The workpiece 1 thus moves in the X-axis direction. The table swiveling base 17 turns, and thus the orientation of the workpiece 1 with respect to the milling cutter 20 can be changed. Further, the rotary table 18 is driven, and thus the workpiece 1 can be turned around the C-axis.

A Y-axis guide rail 26 which extends in the Y-axis direction (a direction vertical to the paper surface in FIG. 1) is arranged on the column 13. A headstock 27 is engaged with the Y-axis guide rail 26. The headstock 27 is formed so as to move in the Y-axis direction along the Y-axis guide rail 26.

A Z-axis guide rail 29 which extends in the Z-axis direction (up and down direction in FIG. 1) is mounted on the headstock 27. A spindle head 30 is mounted on the Z-axis guide rail 29. The spindle head 30 is formed so as to move in the Z-axis direction along the Z-axis guide rail 29.

A spindle shaft 31 is rotatably supported by the spindle head 30. The milling cutter 20 is mounted on the spindle shaft 31. A motor for rotating the milling cutter 20 is connected to the spindle shaft 31. The motor is driven, and thus the milling cutter 20 rotates around the central axis of the spindle shaft 31 as the rotation axis.

The moving device is driven, and thus the headstock 27 moves in the Y-axis direction with respect to the column 13. The milling cutter 20 thus moves in the Y-axis direction. Further, the moving device is driven, and thus the spindle head 30 moves in the Z-axis direction with respect to the headstock 27. The milling cutter 20 thus moves in the Z-axis direction.

As mentioned above, the moving device includes a plurality of moving axes, which are an X-axis, a Y-axis and a Z-axis as linear feed axes, and a C-axis as a rotational feed axis. The milling cutter 20 can be moved linearly relative to the workpiece 1 supported by the table 14. Further, the rotary table 18 is driven, and thus the milling cutter 20 can be rotationally moved relative to the workpiece 1.

Figure 2:
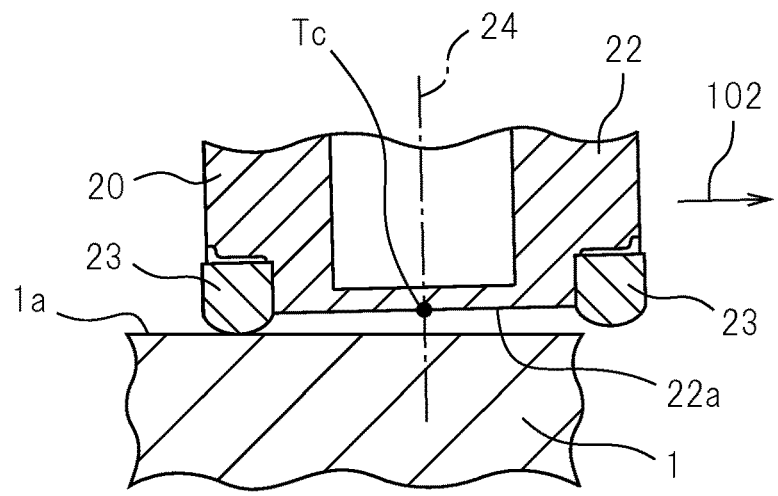
FIG. 2 is an enlarged schematic cross-sectional view of a workpiece and a milling cutter.
Figure 3:
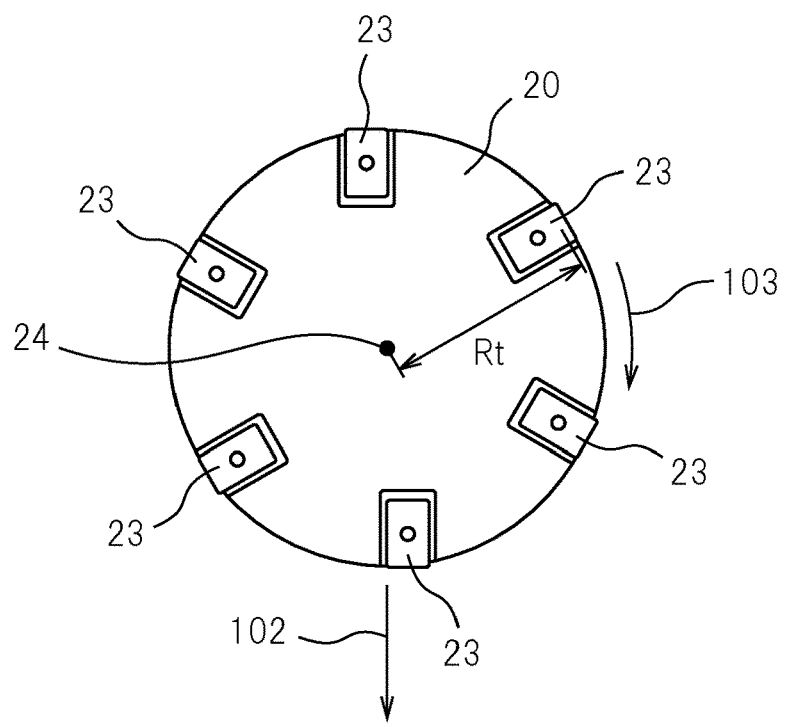
FIG. 3 is a bottom view of a milling cutter.

FIG. 2 illustrates a schematic cross-sectional view of the milling cutter 20 and the workpiece 1. FIG. 3 illustrates a schematic bottom view of the milling cutter 20. With reference to FIGS. 2 and 3, the milling cutter 20 includes a body portion 22 and a cutting portion 23 which cuts the workpiece 1. The body portion 22 of the milling cutter 20 is formed in a columnar shape. The cutting portion 23 is arranged along the circumferential direction of a bottom face 22a of the body portion 22. A plurality of cutting portions 23 are arranged apart from each other. The cutting portion 23 is referred to as "a chip" and is replaceable.

The milling cutter 20 rotates around a rotation axis 24 as a rotation center. The body portion 22 rotates, and thus the cutting portion 23 rotates in a direction indicated by an arrow 103. With reference to FIG. 2, the rotating milling cutter 20 is arranged to be in contact with the surface of the workpiece 1. The surface of the workpiece 1 is a machining surface. The cutting portion 23 is in contact with the workpiece 1. The milling cutter 20 moves relative to the workpiece 1 as indicated by an arrow 102 while rotating, and thus the surface of the workpiece 1 can be machined.

In an example illustrated in FIG. 2, the milling cutter 20 is arranged so that the rotation axis 24 is inclined with respect to the normal line direction of the surface of the workpiece 1. In other words, the bottom face 22a of the body portion 22 is inclined with respect to the surface of the workpiece 1. The cutting portion 23 on the front side in the advancing direction as indicated by the arrow 102 moves detached from the surface of the workpiece 1. The cutting portion 23 arranged on the back side in the advancing direction performs cutting in contact with the surface of the workpiece 1. The milling cutter 20 thus performs cutting process by using a heel portion.

Figure 4:
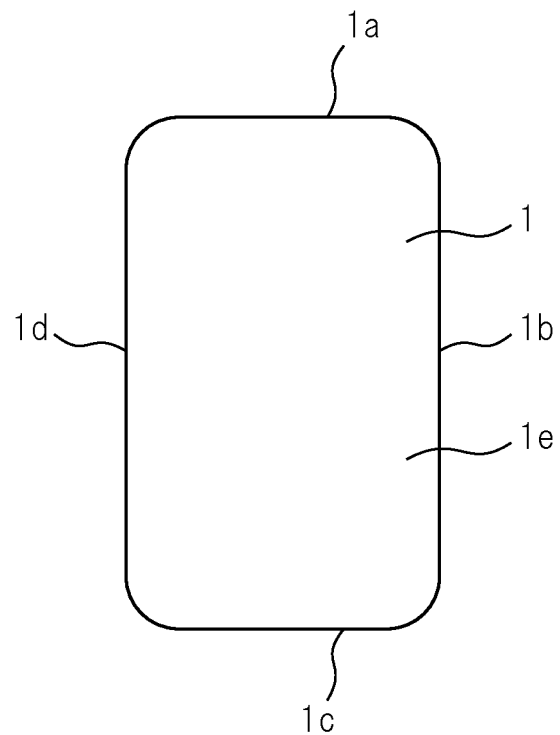
FIG. 4 is a plan view of a workpiece.
Figure 5:
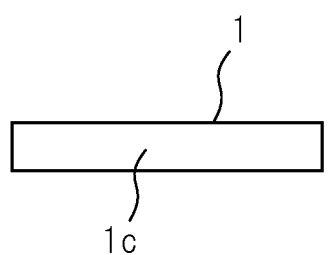
FIG. 5 is a side view of a workpiece.

FIG. 4 illustrates a schematic plan view of a machined workpiece 1. FIG. 5 illustrates a side view of a machined workpiece 1. The workpiece 1 is a plate member. The workpiece 1 includes side faces 1a, 1b, 1c, and 1d, and maximum area surface 1e whose area is the largest. Each of the side faces 1a, 1b, 1c, and 1d is formed to have a area which is smaller than the maximum area surface 1e of the workpiece 1. In cutting process, the side faces 1a, 1b, 1c, and 1d of the workpiece 1 are machined. In this example, the side faces are mirror finished.

With reference to FIG. 2, the milling cutter 20 is arranged so that the side face 1a and the bottom face 22a of the body portion 22 are opposed to each other in order to machine the side faces 1a, 1b, 1c, and 1d of the workpiece 1. The side faces 1a, 1b, 1c, and 1d of the workpiece 1 can be machined by moving the milling cutter 20 relative to the workpiece 1.

Figure 6:
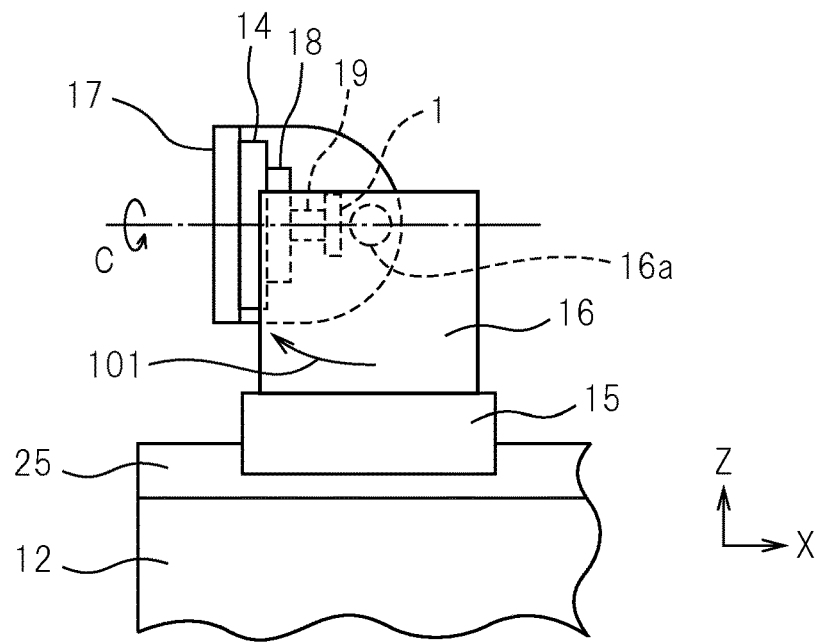
FIG. 6 is a schematic side view of a portion of a turning base which turns a table of a machine tool.

FIG. 6 is a schematic view illustrating a state of a machine tool when the side faces 1a, 1b, 1c, and 1d of the workpiece 1 are machined. The workpiece 1 needs to be arranged so that the side faces 1a, 1b, 1c, and 1d are opposed to the milling cutter 20. For this purpose, the turning base 16 is driven to turn the table swiveling base 17 by 90° as indicated by the arrow 101. At least one side face of the side faces 1a, 1b, 1c, and 1d of the workpiece 1 can be arranged upside.

When the side faces 1a, 1b, 1c, and 1d of the workpiece 1 are machined, four side faces 1a, 1b, 1c, and 1d are successively machined. Next, a method of machining the workpiece 1 will be described.

Figure 7:
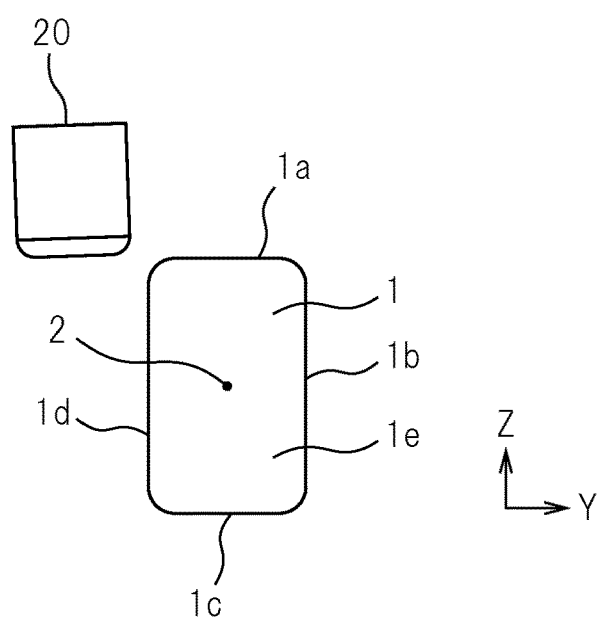
FIG. 7 is a schematic view illustrating a first process of a method of machining a workpiece.

FIG. 7 is a schematic view of a first process of a method of machining the workpiece 1. In the subsequent FIGS. 7 to 13, relative movement of milling cutter 20 with respect to the workpiece 1 is illustrated. The milling cutter 20 shown by a alternate long and short dash line represents the milling cutter 20 arranged in the previous process. In this example, cutting is started from the side face 1a having the smallest area among the side faces 1a, 1b, 1c, and 1d. In the machining method, which is not limited to the above-mentioned embodiment, cutting may be started from the side faces 1b and 1d having the large area.

In the first process, the milling cutter 20 is arranged on a side of the side face 1a of the workpiece 1. In this case, the milling cutter 20 is arranged at a position where the side face 1a is cut, by moving the milling cutter 20 in the Y-axis direction. The milling cutter 20 is moved toward the side face 1a. In this example, the milling cutter 20 is moved relative to the workpiece 1 from a position in front of the position where machining is to be started. In other words, air cutting is performed.

Figure 8:
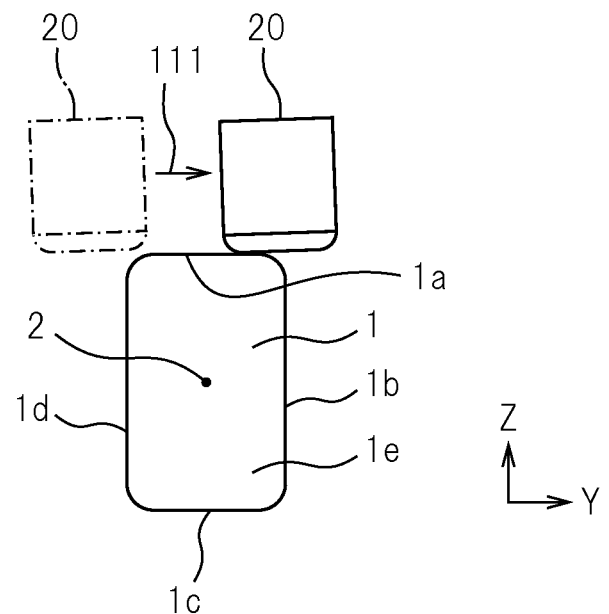
FIG. 8 is a schematic view illustrating a second process of a method of machining a workpiece.

FIG. 8 is a schematic view of a second process of a method of machining the workpiece 1. The side face 1a is started to be machined by the milling cutter 20. The side face 1a of the workpiece 1 is cut by moving the milling cutter 20 along the side face 1a of the workpiece 1 as indicated by an arrow 111. Machining is performed to the corner of the workpiece 1.

Figure 9:
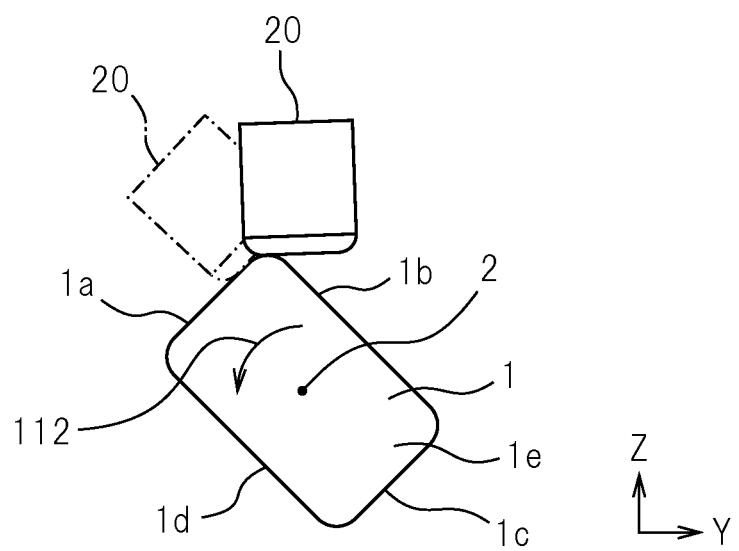
FIG. 9 is a schematic view illustrating a third process of a method of machining a workpiece.

FIG. 9 is a schematic view of a third process of a method of machining the workpiece 1. After finishing machining to the end portion of the side face 1a, the workpiece 1 is rotated around the C-axis in order to form a corner portion having a curved shape. The workpiece 1 is rotated around a rotation axis 2 as indicated by an arrow 112. A corner portion having a curved shape can be formed by cutting the workpiece 1 while rotating the workpiece 1 relative to the milling cutter 20.

Figure 10:
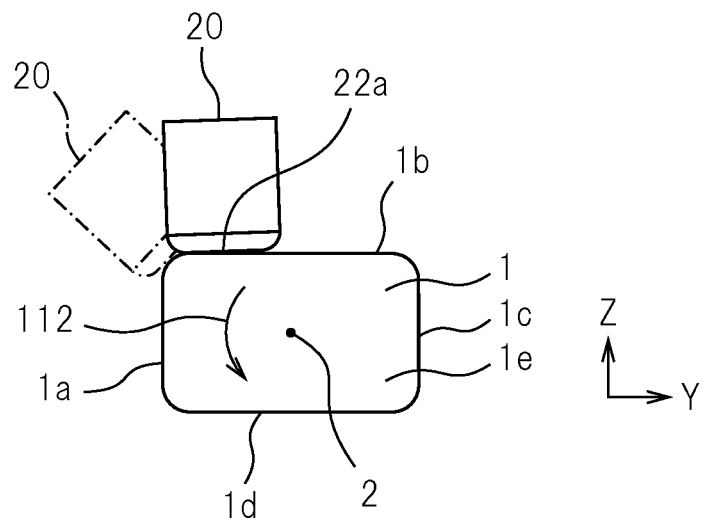
FIG. 10 is a schematic view illustrating a fourth process of a method of machining a workpiece.

FIG. 10 is a schematic view of a fourth process of a method of machining the workpiece 1. FIG. 10 illustrates a state in which the formation of the first corner portion of the workpiece 1 is finished. The workpiece 1 is rotated with respect to the milling cutter 20 until a corner portion of the workpiece 1 is formed. The bottom face 22a of the body portion 22 of the milling cutter 20 is opposed to the side face 1b of the workpiece 1.

Figure 11:
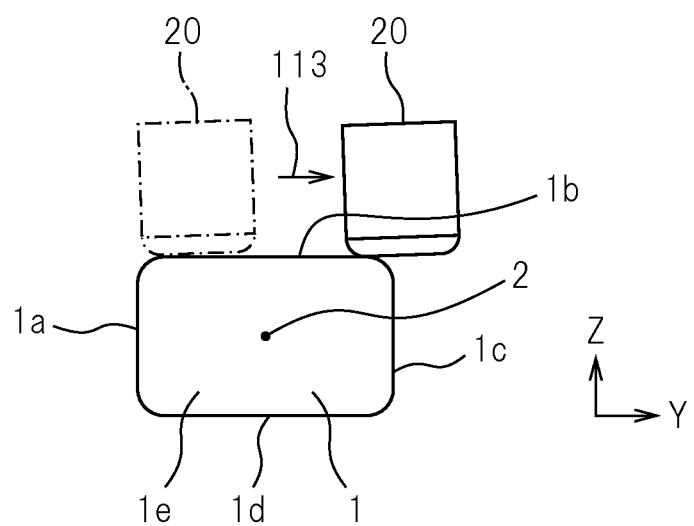
FIG. 11 is a schematic view illustrating a fifth process of a method of machining a workpiece.

FIG. 11 is a schematic view of a fifth process of a method of machining the workpiece 1. Next, the side face 1b is machined by moving the milling cutter 20 along the side face 1b as indicated by an arrow 113. In a similar manner, the side faces 1c and 1d can be formed by combining a linear movement and a rotation movement of the milling cutter 20 with respect to the workpiece 1.

Figure 12:
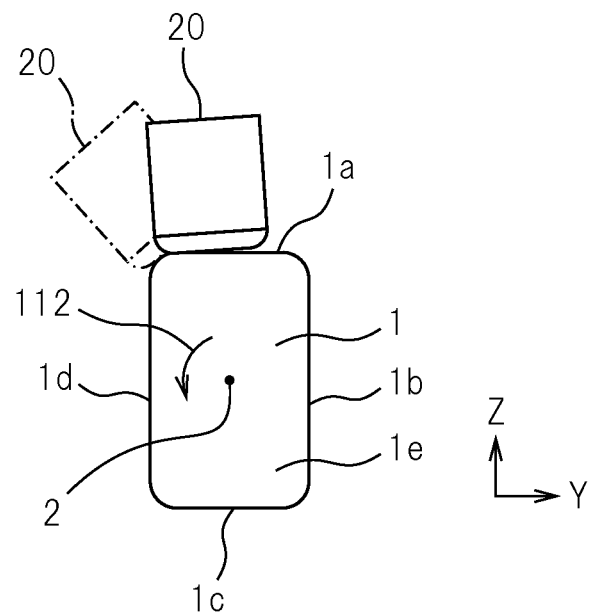
FIG. 12 is a schematic view illustrating a sixth process of a method of machining a workpiece.

FIG. 12 is a schematic view of a sixth process of a method of machining the workpiece 1. FIG. 12 illustrates a state in which the milling cutter 20 moves around all the side faces of the workpiece 1 and returns to the end portion of the side face 1a. In such a manner, the side faces 1a, 1b, 1c, and 1d of the workpiece 1 can be cut successively.

Figure 13:
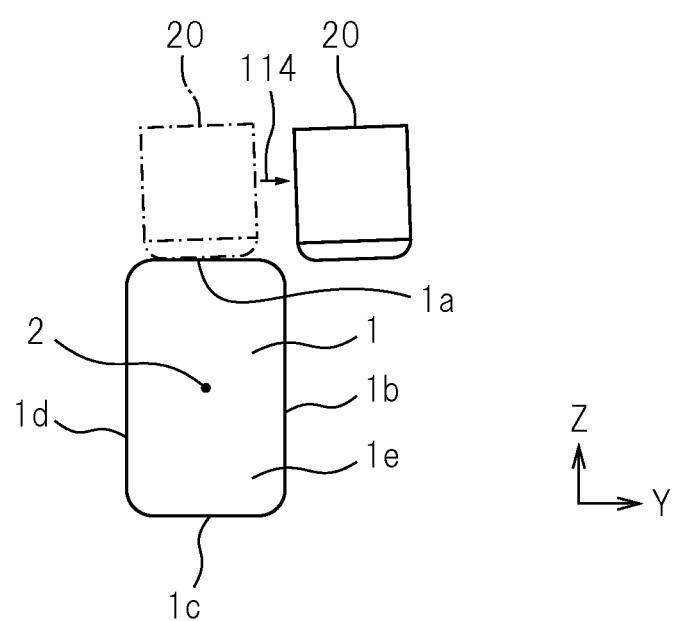
FIG. 13 is a schematic view illustrating a seventh process of a method of machining a workpiece.

FIG. 13 is a schematic view of a seventh process of a method of machining the workpiece 1. After machining the side faces 1a, 1b, 1c, and 1d, machining is again performed along the side face 1a. As indicated by an arrow 114, the milling cutter 20 is moved along the side face 1a. At this time, a linear movement is continued over the position where machining of the side face 1a is finished. In other words, the milling cutter 20 is moved to keep a distance from the workpiece 1. Such an operation prevents machining precision of the side face 1a from deteriorating.

As mentioned above, high-precision machining of the side faces 1a, 1b, 1c, and 1d of the workpiece 1 can be performed by using the milling cutter 20. For example, the side faces 1a, 1b, 1c, and 1d can be mirror finished.

As comparative example, a method of machining a side face of a plate member by using an end mill as a first rotary tool will now be described. In comparative example, machining is performed by using a side cutting edge of a rotary tool. Here, the side cutting edge of a rotary tool represents a cutting edge on a plane extending in a direction parallel to the rotation axis of the rotary tool. The end cutting edge of the rotary tool represents a cutting edge on an end face extending in a direction perpendicular to the rotation axis of the rotary tool.

Figure 14:
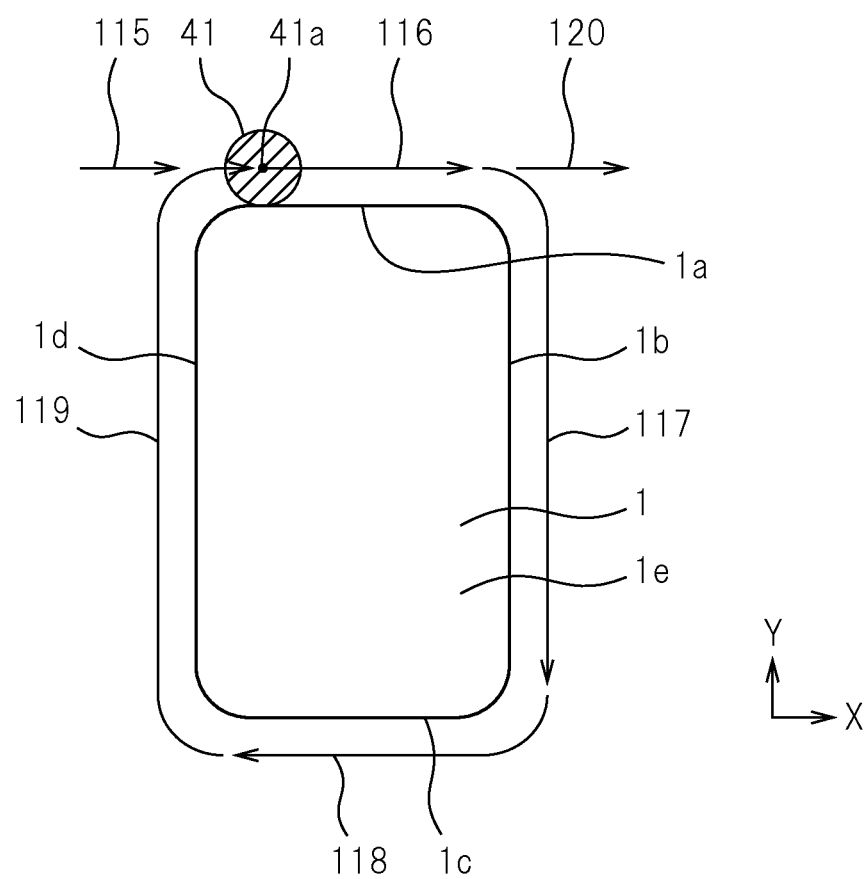
FIG. 14 is a schematic view illustrating a method of machining a workpiece of comparative example.

FIG. 14 illustrates a schematic view of a machining method of comparative example. In the machining method of comparative example, the side faces 1a, 1b, 1c, and 1d of the workpiece 1 is machined by using an end mill 41 as a first rotary tool. The end mill 41 is arranged so that the axis direction of the end mill 41 is parallel to the side faces 1a, 1b, 1c, and 1d. With reference to FIG. 1, in place of the milling cutter 20, the end mill 41 can be mounted on the machine tool 10. The turning base 16 is controlled so that the side faces 1a, 1b, 1c, and 1d of the workpiece 1 are parallel to the axis direction of the end mill 41. Thereafter, the workpiece 1 can be machined by moving the end mill 41 along a side face of the workpiece 1.

With reference to FIG. 14, a tool tip point 41a which is the rotation center of the end mill 41 moves along the outline of the workpiece 1 during machining of the end mill 41. The side face 1a of the workpiece 1 is machined with a side cutting edge of the end mill 41 by moving the end mill 41 as indicated by an arrow 115 and an arrow 116. In a similar manner, the side faces 1b, 1c, and 1d are machined by moving the end mill 41 along the side faces 1b, 1c, and 1d as indicated by arrows 117, 118, and 119. Machining of the side faces 1a, 1b, 1c, and 1d of the workpiece 1 is completed by further moving the end mill 41 as indicated by arrows 116 and 120.

When machining is performed by using a side cutting edge of the end mill 41 in such a manner as in comparative example, the radius of gyration of a portion in contact with a machining surface is equal to the radius of the end mill 41. This reduces the radius of gyration of a portion to be cut. In order to lessen the cusp height of the machining surface, the tool diameter of the end mill 41 needs to be increased, and the size of the machine tool needs to be large. When an end mill is rotated at a high speed, a spindle shaft of the end mill swings or vibrates, which may negatively affect the machining surface.

By machining with an end cutting edge of a milling cutter in such a manner as in the present embodiment, the radius of gyration when a cutting portion rotates is made to be large. With reference to FIG. 3, since the milling cutter 20 rotates as indicated by the arrow 103, the radius of gyration of a cutting portion of the milling cutter 20 is a cutting edge radius Rt, which is larger than the radius of gyration of an end mill. The machining speed of the cutting portion 23 can be made high, and a high accuracy surface machining can be easily performed. Since the radius of curvature of a cutting surface of the end cutting edge 23a is large, the machining precision is improved compared with the case in which machining is performed by an end mill or the like.

Further, since the workpiece 1 is in contact with an end cutting edge of the milling cutter 20, a swing or a vibration of the main axis of the milling cutter 20 can be suppressed. A negative influence on a machining surface due to a swing or a vibration of the main axis can be suppressed. Further, mirror finishing can be performed by a milling cutter without using a tool made of a valuable material such as diamond.

In the machining method, the milling cutter 20 is arranged so that the rotation axis 24 thereof is inclined with respect to the normal line direction of a machining surface of the workpiece 1. In other words, machining is performed in a state in which the bottom face of the milling cutter 20 is inclined with respect to the machining surface of the workpiece 1. By employing this configuration, a high-precision machining can be performed. For example, mirror finishing can be easily performed. In the above-mentioned embodiment, cutting process is performed with a heel portion of the milling cutter 20. However, the present invention is not limited to the embodiment, and machining may be performed by using a front end in the advancing direction of the milling cutter 20. In other words, machining may be performed by using a toe portion of the milling cutter 20.

In many cases of machining, the end mill 41 of comparative example is selected as a tool for machining a side face of the plate workpiece 1. In a CAM apparatus or the like, a tool path in a case of using the end mill 41 is output. A control device 55 of the machine tool 10 reads input information including a tool path of the end mill 41 along the outline of the workpiece 1. Next, the read input information is converted and a tool path for machining the side faces 1a, 1b, 1c, and 1d of the workpiece 1 by using an end cutting edge of the milling cutter 20 is generated.

Figure 15:
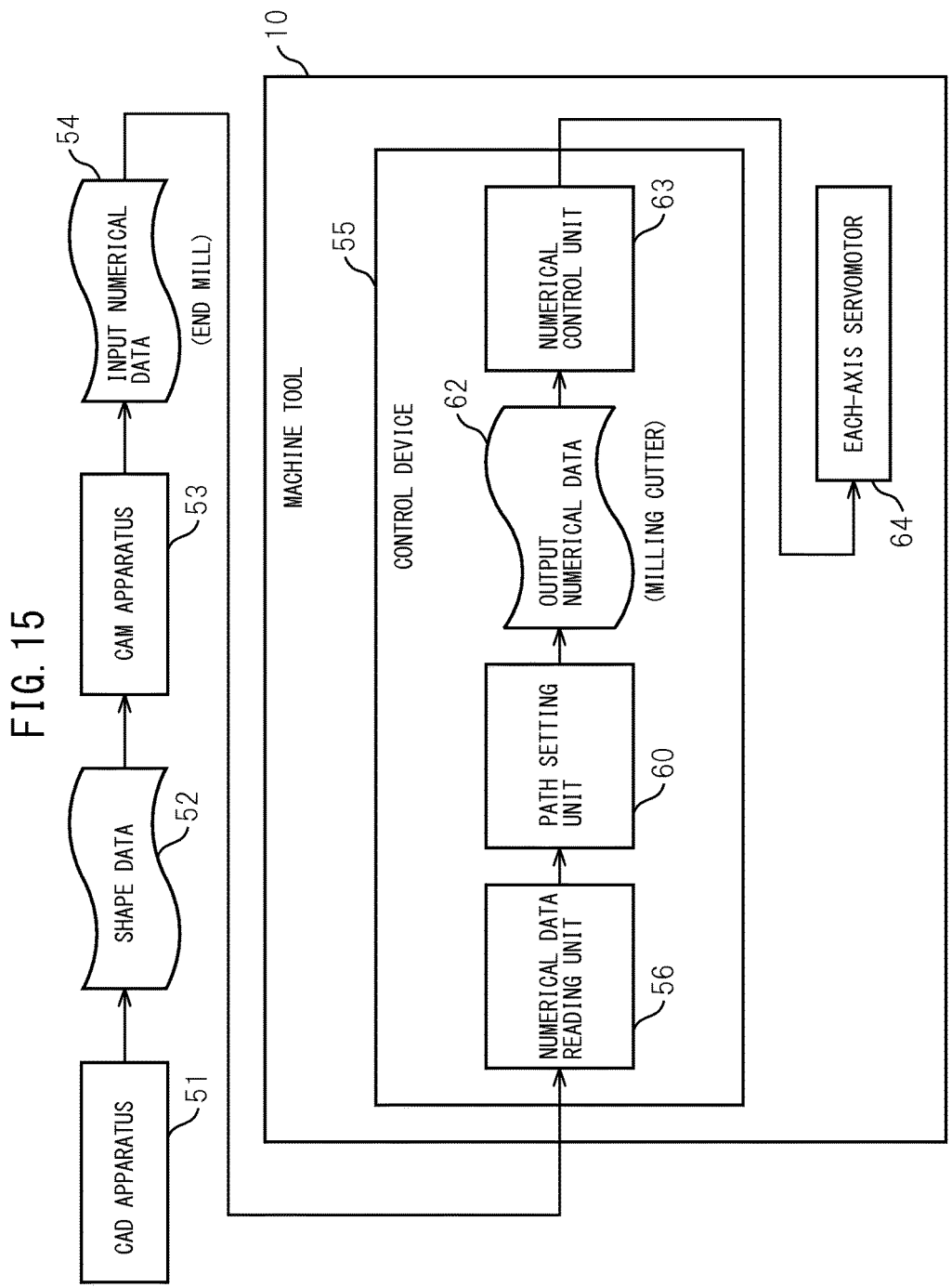
FIG. 15 is a schematic view of a machining system.

FIG. 15 illustrates a schematic view of a machining system comprising a machine tool 10 and a device for generating input numerical data 54 for inputting to the machine tool 10. The shape of the workpiece 1 is designed by a CAD (computer aided design) apparatus 51. The CAD apparatus 51 provides a CAM (computer aided manufacturing) apparatus 53 with shape data 52 of the workpiece 1.

In the CAM apparatus 53, the input numerical data 54 as input information to be input to the control device 55 of the machine tool 10 is generated based on the shape data 52. The input numerical data 54 is numerical data when a side face of the workpiece 1 is machined by using a side cutting edge of the end mill 41 as the first rotary tool. The input numerical data 54 includes data representing a path of a tool tip point when the end mill 41 is used. The tool tip point of the end mill 41 is a point of rotation center of the bottom face. The input numerical data 54 includes coordinate values of the X-axis, Y-axis and Z-axis.

The numerical control machine tool 10 includes the control device 55. The control device 55 includes an arithmetic processing unit. The arithmetic processing unit includes a microprocessor (CPU) performing arithmetic processing and the like, a ROM (Read Only Memory) and a RAM (Random Access Memory) as storage devices, and other peripheral circuits.

The control device 55 generates output numerical data 62 using input numerical data 54. The control device 55 includes a numerical data reading unit 56 which functions as an input information reading unit and a path setting unit 60. The numerical data reading unit 56 has a function of reading the input numerical data 54. The numerical data reading unit 56 reads the input numerical data 54. The numerical data reading unit 56 outputs a coordinate value sequence. The coordinate value sequence includes the coordinate values of the X-axis, Y-axis and Z-axis and the rotational angle of the C-axis.

The path setting unit 60 generates output numerical data 62 based on the read input numerical data 54. The path setting unit 60 sets a tool path for machining by using an end cutting edge of the milling cutter 20. The path setting unit 60 sets a tool path of the milling cutter 20 based on the inclination angle or the like of the milling cutter 20 with respect to the workpiece 1. The output numerical data 62 includes numerical data for moving the milling cutter 20 relative to the workpiece 1. In other words, the output numerical data 62 includes a command for a moving device when the milling cutter 20 is used.

The output numerical data 62 which is output from the path setting unit 60 can be set by, for example, the coordinate values of X-axis, Y-axis and Z-axis of the tool tip point of the milling cutter 20, and a relative angle between the workpiece 1 and the milling cutter 20 on the C-axis.

The output numerical data 62 is input to a numerical control unit 63. The numerical control unit 63 drives each-axis servomotor 64 of the moving device based on the output numerical data 62. The each-axis servomotor 64 includes an X-axis servomotor, a Y-axis servomotor, a Z-axis servomotor, a C-axis servomotor, and the like. This enables a relative movement between the workpiece 1 and the milling cutter 20.

Next, a control for generating a tool path for performing machining by using an end cutting edge of the milling cutter 20 in the path setting unit 60 will be described.

A tool path when the end mill 41 of comparative example as illustrated in FIG. 14 is used is set in the input numerical data 54. The path setting unit 60 converts the tool path into a path which passes the contour of the workpiece 1 by using the tool path when the end mill 41 is used.

Figure 16:
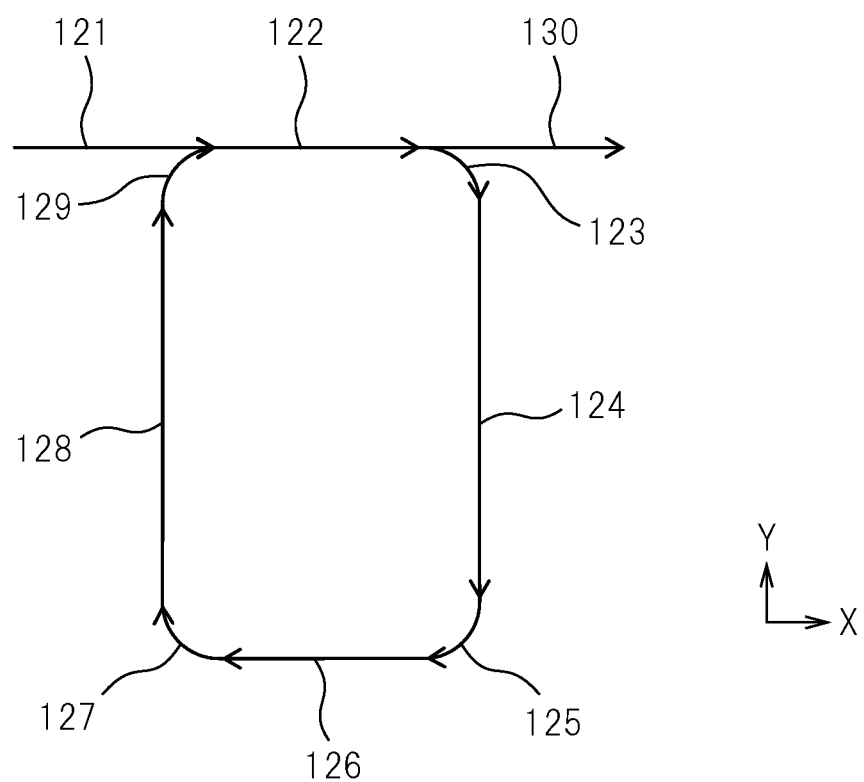
FIG. 16 is a schematic view illustrating a path passing through the contour of a workpiece to be created in a numerical data reading unit.

FIG. 16 is a schematic view illustrating a path which passes the contour of the workpiece 1. An arrow 121 indicates that a tool enters a workpiece. Arrows 122 to 129 indicate paths passing through the side faces 1a, 1b, 1c, and 1d of the workpiece 1. Further, arrows 122 and 130 indicate that a tool is detached from the workpiece. A shape surrounded by the arrows 122 to 129 is equal to the contour of the machined workpiece 1. For example, the arrow 122 corresponds to the side face 1a of the workpiece 1, and the arrow 124 corresponds to the side face 1b.

A path which passes the contour of the workpiece 1 can be calculated by, for example, the tool path of the end mill 41 as illustrated in FIG. 14 is moved inside by the radius of the end mill 41. In other words, an operation which offsets by a length corresponding to the radius of the end mill 41 is performed.

Next, a tool path for performing machining with an end cutting edge of the milling cutter 20 is generated based on a path which passes the contour of the workpiece 1. The following example is illustrated by using a workpiece coordinate system whose origin is the position of the center of mass of the maximum area surface 1e of the workpiece 1, and may be illustrated by using a machine coordinate system.

A vector Pn which is a point sequence representing a path which passes the contour of the workpiece 1 is represented by the following expression (1). The point sequence can be represented by the coordinate of the X-axis and the coordinate of the Y-axis. A variable n represents the number of point included in a path. In this example, N points for calculating the tool path are set.

[Mathematical 1]

$$\vec{P_n} = \begin{bmatrix} P_{n_x} \\ P_{n_y} \end{bmatrix} (1 \le n \le N) \tag{1}$$

A vector Qn which is a command value of an output of the path setting unit 60 is represented by the following expression (2). The command value of the output of the path setting unit 60 can be set by the coordinate of the Y-axis, the coordinate of the Z-axis, and the rotational angle around the C-axis. The tool path setting unit 60 outputs a vector Qn as a command value of the expression (2) by using the point sequence of the expression (1).

[Mathematical 2]

$$\vec{Q_n} = \begin{bmatrix} Q_{n_y} \\ Q_{n_z} \\ Q_{n_c} \end{bmatrix} (1 \le n \le N) \tag{2}$$

Figure 17:
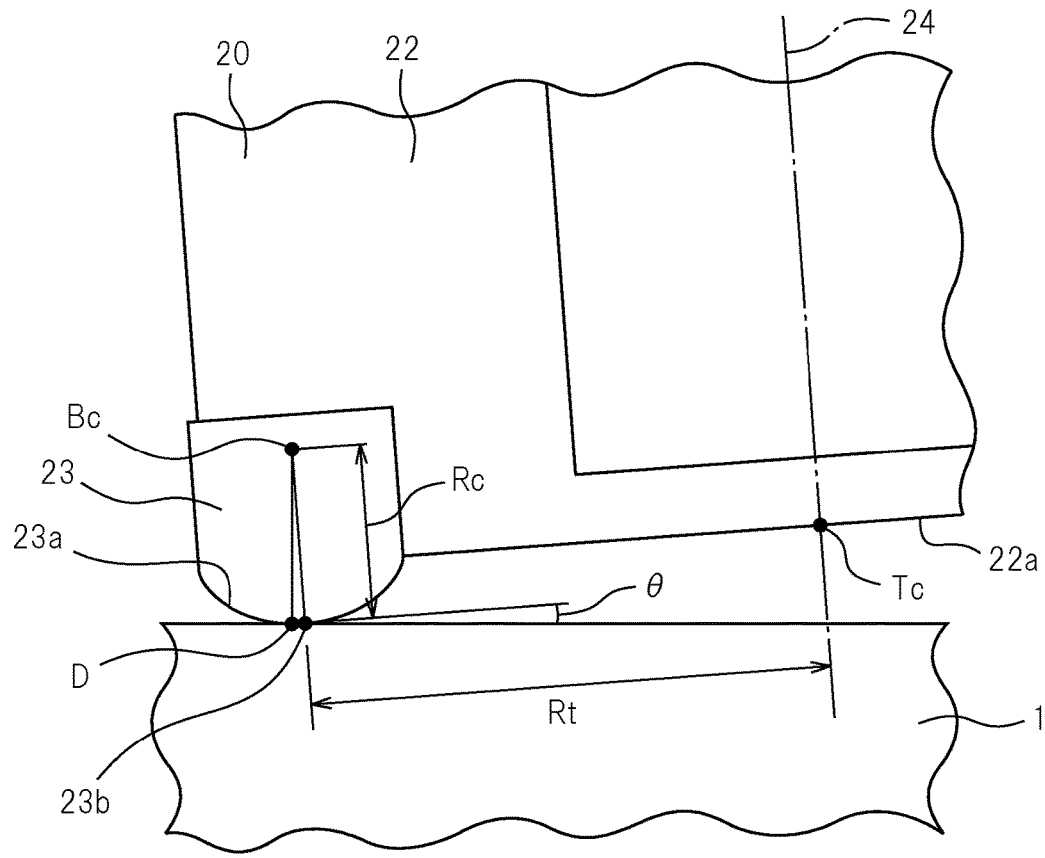
FIG. 17 is an enlarged schematic cross-sectional view of a portion where a milling cutter and a workpiece are in contact with each other.

FIG. 17 is an enlarged cross-sectional view of the milling cutter 20 and the workpiece 1 for describing variables for calculating a tool path of the milling cutter 20. FIG. 17 is an enlarged schematic cross-sectional view of a portion where the workpiece 1 is in contact with the milling cutter 20. For ease of understanding, FIG. 17 illustrates a milling cutter so that the radius of curvature of an end cutting edge 23a is smaller than that of the actual milling cutter, and so that a lead angle θ is larger than the actual lead angle.

The cutting portion 23 includes the end cutting edge 23a. The bottom face of the milling cutter 20 is opposed to a machining surface of the workpiece 1. The end cutting edge 23a is formed so that the cross-sectional shape is an arc. The end cutting edge 23a includes a vertex 23b. A tool corner radius Rc is the radius of curvature at the end cutting edge 23a of the cutting portion 23. A point Bc is the center point of the tool corner radius Rc. The vertex 23b is a point which crosses the end cutting edge 23a when a line parallel to the rotation axis 24 passing the point Bc is drawn.

The lead angle θ is an inclination angle of the milling cutter with respect to a machining surface of the workpiece 1. For example, the lead angle θ is an angle formed by the bottom face 22a of the body portion 22 and the machining surface of the workpiece 1. Alternatively, the lead angle θ is an angle formed by the normal line direction of a machining surface of the workpiece 1 and the rotation axis 24. Examples of the lead angle θ include a small angle not larger than 1°. In this example, 0.05° is adopted for the lead angle θ.

A tool tip point Tc is set on the bottom face of the body portion 22. The tool tip point of the milling cutter 20 in the present invention is a point where the rotation axis 24 of the milling cutter 20 and the bottom face of the milling cutter 20 are crossed with each other. The cutting edge radius Rt is a distance between the tool tip point Tc and the vertex 23b in the diameter direction of the milling cutter 20. A point of contact D is a point where the cutting portion 23 is in contact with the workpiece 1. In this example, since the lead angle θ is small and the tool corner radius Rc is large, it may be approximated that the point of contact D and the vertex 23b are located at the same position.

Figure 18:
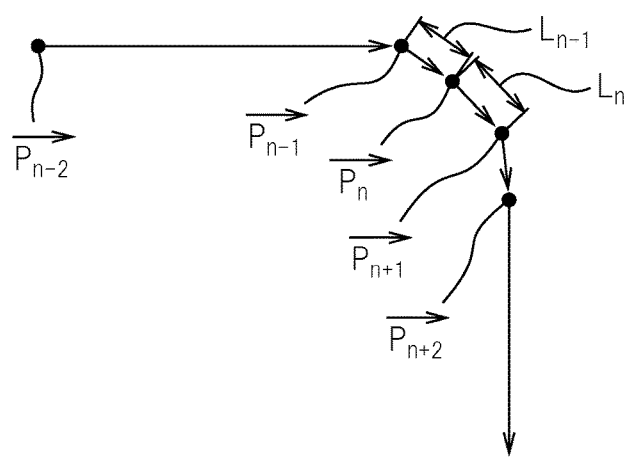
FIG. 18 is a view illustrating variables to be used for calculating a tool path of a milling cutter.

FIG. 18 is an explanatory drawing for calculating a tool path when the milling cutter 20 is used. An advancing direction at a vector Pn which is the n-th point of P is calculated. A vector ΔPn representing a movement from the n-th point P to the (n+1)-th point P is calculated by the following expression (3). A moving distance Ln from the n-th point P to the (n+1)-th point P is calculated by the following expression (4).

[Mathematical 3]

$$\vec{\Delta P_n} = \vec{P_{n+1}} - \vec{P_n} (1 \le n \le N-1) \tag{3}$$

$$L_n = |\vec{\Delta P_n}| (1 \le n \le N-1) \tag{4}$$

Next, as a normalized advancing direction when moving from the n-th point P to the (n+1)-th point P, a vector $U1_n$ is calculated by the expression (5). Further, a vector $U1_{n-1}$ which is an advancing direction when moving from the (n−1)-th point P to the n-th point P is determined. Thereafter, an advancing direction $U2_n$ in which points before and after the n-th point P are averaged is determined by the expression (6).

[Mathematical 4]

$$\vec{U_{1_n}} = \frac{\vec{\Delta P_n}}{|\vec{\Delta P_n}|} = \frac{\vec{\Delta P_n}}{L_n} (1 \le n \le N-1) \tag{5}$$

$$\vec{U_{2_n}} = \frac{\vec{U_{1_{n-1}}} + \vec{U_{1_n}}}{|\vec{U_{1_{n-1}}} + \vec{U_{1_n}}|} (2 \le n \le N-1) \tag{6}$$

Although in the above-mentioned example, advancing directions before and after the n-th point P are taken into consideration in order to accurately calculate the advancing direction of the n-th point, advancing directions before and after the n-th point P need not be taken into account at a straight portion immediately before entering a curved portion. In other words, only a straight movement portion immediately before the curved portion may be taken into consideration. When entering a straight portion from a curved portion, only a straight movement portion can be taken into consideration in a similar manner to the above. As illustrated in FIG. 18, it is set that the moving distance of the point P on the straight movement portion is large and the moving distance of the point P on the curved portion is small. In this example, a length threshold T is set and an advancing direction U3$_n$ can be determined by the following expression (7) based on moving distances before and after the point P and the length threshold T. The length threshold T can be set based on a moving distance on the straight portion and a moving distance on the curved portion.

[Mathematical 5]

$$\overrightarrow{U_{3D}} = \begin{cases} \overrightarrow{U_{1_{n-1}}} & (L_{n-1} > T, L_n \leq T) \\ \overrightarrow{U_{1_n}} & (L_{n-1} \leq T, L_n > T) \quad (2 \leq n \leq N-1) \\ \overrightarrow{U_{2_n}} & \text{(Region other than the above region)} \end{cases} \quad (7)$$

Next, since the first point (n=0) and the last point (n=N) are not calculated in the expression (7), advancing directions on the first point and the last point are set. Normalized advancing directions at all points are represented by a vector Vn of the following expression (8).

[Mathematical 6]

$$\overrightarrow{V_n} = \begin{cases} \overrightarrow{U_{1_n}} & (n = 1) \\ \overrightarrow{U_{3_n}} & (2 \leq n \leq N-1) \\ \overrightarrow{U_{1_{n-1}}} & (n = N) \end{cases} \quad (8)$$

Next, a vector On as an offset vector from the point of contact D of the cutting portion to the tool tip point Tc is calculated. The vector On is represented by the following expression (9).

[Mathematical 7]

$$\overrightarrow{O_n} = \begin{bmatrix} V_{n_x} \cdot B_x - V_{n_y} \cdot B_y \\ V_{n_x} \cdot B_y + V_{n_y} \cdot B_x \end{bmatrix} (1 \leq n \leq N) \quad (9)$$

The variable Bx and variable By are calculated from the following expression (10). The variable Dr represents the rotation direction of the workpiece 1. For example, when the rotation direction of the workpiece 1 is clockwise, the variable Dr is set to 1, and when the rotation direction of the workpiece 1 is counterclockwise, the variable Dr is set to (−1). The variable Bx and the variable By are the same value regardless of the position of the point P. For this reason, the variables may be calculated in advance, and quoted every time each of the advancing directions of a plurality of points P is calculated.

[Mathematical 8]

$$\vec{B} = \begin{bmatrix} B_x \\ B_y \end{bmatrix} = R_c \cdot \begin{bmatrix} \sin\theta \\ 1 - \cos\theta \end{bmatrix} + R_i \cdot D_r \cdot \begin{bmatrix} \cos\theta \\ \sin\theta \end{bmatrix} \quad (10)$$

Next, a vector Qn as a command value is calculated by the expression (11) based on a vector Vn which is the advancing direction of the point P and an vector On as a offset vector.

[Mathematical 9]

$$\overrightarrow{Q_n} = \begin{bmatrix} P_{n_x} + O_{n_x} \\ P_{n_y} + O_{n_y} \\ \operatorname{atan2}(V_{n_y} \cdot D_r, V_{n_x} \cdot D_r) + \theta \cdot D_r \end{bmatrix} \quad (11)$$

In the expression (11), the mathematical function (a tan 2) is a function which calculates the arc tangent (inverse tangent) of a numerical value. The mathematical function (a tan 2) is represented by the expression (12).

[Mathematical 10]

$$\operatorname{atan2}(y, x) = \begin{cases} \tan^{-1}\frac{y}{x} & (x > 0) \\ \tan^{-1}\left(\frac{y}{x}\right) + \pi, & (y \geq 0, x < 0) \\ \tan^{-1}\left(\frac{y}{x}\right) - \pi & (y < 0, x < 0) \\ \frac{\pi}{2} & (y > 0, x = 0) \\ -\frac{\pi}{2} & (y < 0, x = 0) \\ NaN & (x = 0, y = 0) \end{cases} \quad (12)$$

The vector Qn which is a command value expresses the coordinate value of the Y-axis and the coordinate value of the Z-axis of the tool tip point Tc, and the rotational angle of the workpiece 1 around the C-axis. The command value can be calculated based on the relative position of the tool center Tc with respect to the point of contact D of the cutting portion 23 and the advancing direction of the point of contact D. As mentioned above, the path setting unit 60 can set the relative position of the milling cutter 20 with respect to the workpiece 1. In other words, a tool path of the milling cutter 20 can be set.

An effect of the machining method will be described in more detail. When machining is performed by using an end cutting edge of the milling cutter 20, the radius of curvature of a portion where the workpiece 1 is machined is large. For example, the diameter of the end mill of comparative example is from 10 mm to 16 mm. In this case, the radius of curvature of a portion where the workpiece 1 is machined is from 5 mm to 8 mm. In contrast, the tool corner radius Rc which is the radius of curvature of the end cutting edge 23a of the cutting portion 23 of the milling cutter of the above-mentioned example is about 100 mm. As mentioned above, since the radius of curvature of a portion where the workpiece 1 is machined is large, high-precision machining can be performed.

When machining is performed by using an end cutting edge of a milling cutter, the radius of gyration when a cutting portion rotates is large. The radius of gyration when a cutting portion rotates is equal to the cutting edge radius Rt. In the above-mentioned example, the cutting edge radius Rt is about 37 mm. In contrast, the radius of gyration of a portion of the end mill 41 for cutting is equal to the radius of the end mill 41. For example, the radius of gyration of the end mill 41 is from 5 mm to 8 mm. As mentioned above, the radius of gyration of a portion of the milling cutter 20 for cutting may be larger than that of the end mill 41. This can make the machining speed of a cutting portion with respect to the workpiece 1 high and enables high precision surface machining.

In the above-mentioned embodiment, the control device 55 generates a tool path of the milling cutter 20 by using the input numerical data 54 generated by the CAM apparatus 53. However, the present invention is not limited to the embodiment, and a tool path of the milling cutter 20 may be generated by reading the shape data of the workpiece 1 output from a CAD apparatus by the numerical data reading unit 56. A path which passes the contour of the workpiece 1 can be generated based on the shape of the workpiece 1. By this control, a high precision cutting process can be performed by inputting only information of the outline of a workpiece such as the contour of a workpiece and information of a cutting edge of a rotary tool. For example, high-precision machining can be performed by inputting the coordinate of the outline of a workpiece and the tool corner radius Rc and the cutting edge radius Rt of the cutting portion 23. At this time, for a variable such as a lead angle, a pre-set value can be used.

For the input information read by the input information reading unit, information including a tool path in which machining is performed by using a side cutting edge of a first rotary tool along the outline of a workpiece can be adopted. For example, the input information may be a first machining program including a tool path of the first rotary tool. In the input numerical data on which a tool path of a rotary tool is directly described, the relative position of the rotary tool with respect to the workpiece is represented by the coordinate values of the point sequence. In contrast, a machining program includes a macro code or the like in order for a user to read or create the program easily. The input information reading unit may read such a machining program. In a similar manner, a path setting unit may output a second machining program including a tool path in which machining is performed using an end cutting edge of a milling cutter as output information.

With reference to FIG. 1, the machine tool 10 includes a turning base 16 and a table swiveling base 17 for changing the orientation of the workpiece 1. However, the present invention is not limited to the embodiment, and any machine tool which can perform machining using an end cutting edge of a tool.

Figure 19:
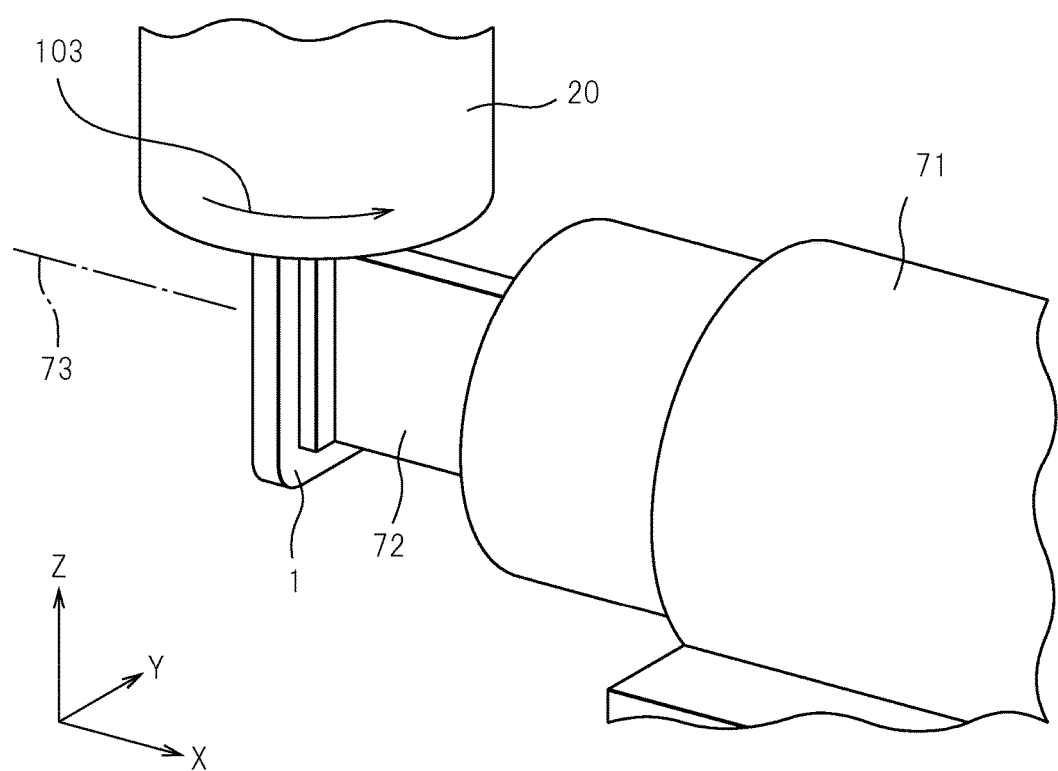
FIG. 19 is a schematic perspective view of another machine tool.

FIG. 19 illustrates a schematic perspective view of another machine tool 10. Another moving device of the machine tool 10 includes a rotary workpiece head 71. The workpiece 1 is supported by a rotary workpiece head 71 via the holding member 72. The rotary workpiece head 71 is driven, and thus the workpiece 1 can be rotated around the A-axis 73. The milling cutter 20 is formed to rotate as indicated by an arrow 103. The milling cutter 20 is formed to move in the Y-axis direction and the Z-axis direction. Also in such a machine tool, machining of a side face of the workpiece 1 in a similar manner to the above-mentioned embodiment can be performed.

In the above-mentioned embodiment, the first rotary tool is an end mill, and the second rotary tool is a milling cutter. However, the present invention is not limited to the embodiment, and a rotary tool for machining while rotating around the rotation axis can be used.

The above-described embodiments can be appropriately combined with each other. In the above-described drawings, the same reference numerals are attached to the same or corresponding portions. The above-described embodiments are merely examples and are in no way intended to limit the invention. Further, the above-described embodiments include modifications indicated in the scope of claims.

REFERENCE SIGNS LIST

1 workpiece
1*a* to 1*d* side face
2 rotation axis
10 machine tool
20 milling cutter
22 body portion
22*a* bottom face
23 cutting portion
23*a* end cutting edge
24 rotation axis
41 end mill
54 input numerical data
55 control device
56 numerical data reading unit
60 path setting unit
62 output numerical data
71 rotary workpiece head

The invention claimed is:

1. A machine tool in which a rotary tool is moved relative to a workpiece to machine the workpiece, comprising:
   a spindle configured to hold a first rotary tool and a second rotary tool separately at a time;
   a control device of the machine tool, the control device comprising;
      an input information reading unit which reads an input information including a tool path in which machining is performed by using a side cutting edge of the first rotary tool along an outline of the workpiece, the first rotary tool being arranged so that an axis direction of the first rotary tool is parallel to a side face of the workpiece; and
      a path setting unit which generates, based on the input information read by the input information reading unit, a tool path in which machining is performed by using an end cutting edge of the second rotary tool so that a bottom face of the second rotary tool faces the side face of the workpiece, the second rotary tool being a milling cutter whose diameter is larger than a diameter of the first rotary tool, comprising a body portion, which has the bottom face facing the workpiece, and comprising a plurality of cutting portions that are formed in the bottom face of the body portion and arranged apart from each other in a circumferential direction, and each of the cutting portions having the end cutting edge;
   a moving device which moves the end cutting edge of the second rotary tool relative to the workpiece while the plurality of cutting portions rotates around a rotation axis of the second rotary tool more than one turn so as to machine the workpiece in accordance with the tool path set by the path setting unit.

2. The machine tool of claim 1, wherein
   the path setting unit generates the tool path in which machining is performed by inclining the second rotary tool relative to the workpiece so that the bottom face of the second rotary tool is inclined with respect to a machining surface of the workpiece.

3. The machine tool of claim 1, wherein
   the input information reading unit reads a first machining program as the input information including the tool path in which machining is performed by using a side cutting edge of the first rotary tool, and the path setting unit outputs a second machining program including the tool path in which machining is performed by using the end cutting edge of the second rotary tool.

\* \* \* \* \*